J. W. ATKINSON & H. J. BROWN.
TIRE HOLDER.
APPLICATION FILED JUNE 15, 1915.
1,185,163.
Patented May 30, 1916.
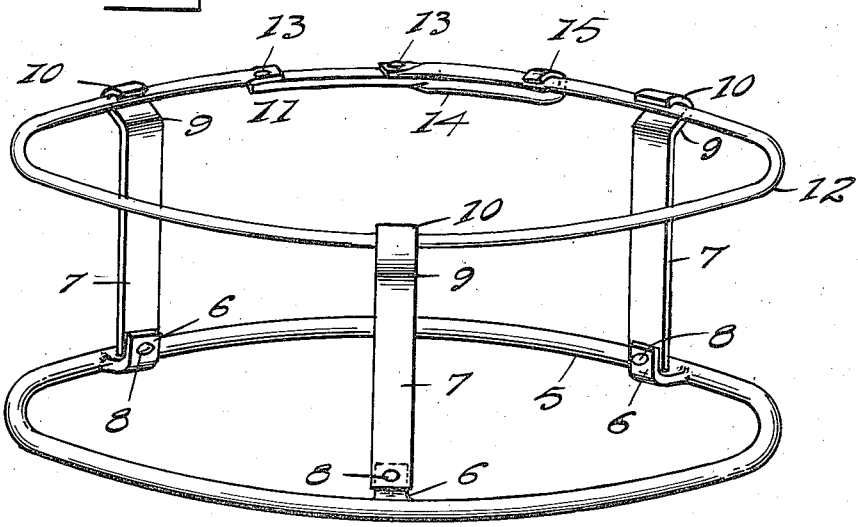
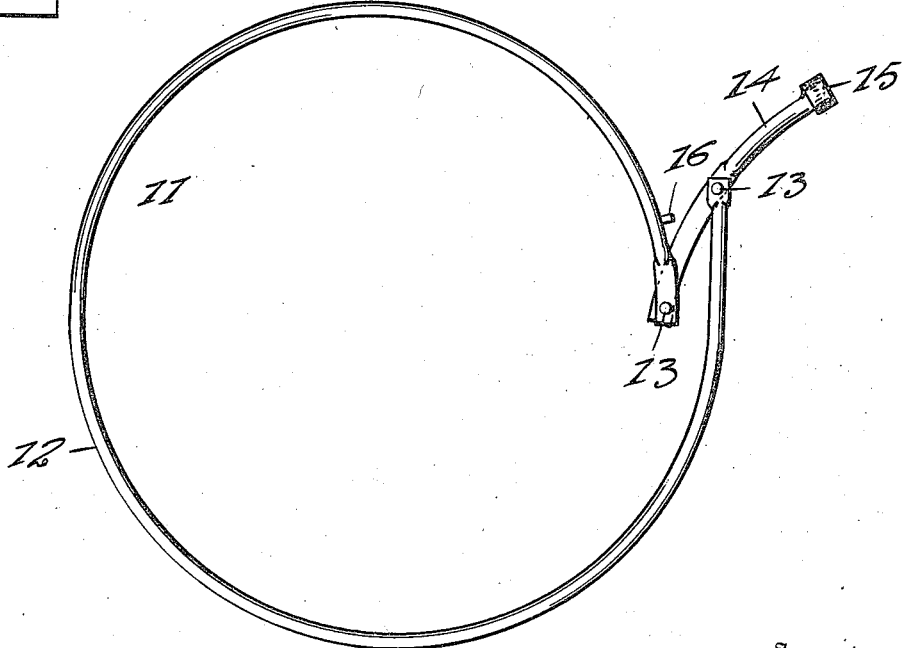
Witnesses
C. P. Beall.
Richard Seebold.
Inventors
J. W. Atkinson,
H. J. Brown.
By
Attorney

UNITED STATES PATENT OFFICE.

JOHN W. ATKINSON AND HIRUM J. BROWN, OF HUMANSVILLE, MISSOURI.

TIRE-HOLDER.

1,185,163.
Specification of Letters Patent.
Patented May 30, 1916.

Application filed June 15, 1915. Serial No. 34,202.

*To all whom it may concern:*

Be it known that we, JOHN W. ATKINSON and HIRUM J. BROWN, citizens of the United States, residing at Humansville, in the county of Polk and State of Missouri, have invented certain new and useful Improvements in Tire-Holders; and we do hereby declare the following to be a full, clear, and exact description of the invention, such as will enable others skilled in the art to which it appertains to make and use the same.

This invention relates to holders or forms especially designed for attachment to motor vehicles for holding and retaining tires in proper shape.

The invention has for its object to provide a simple and efficient tire holder including essentially a plurality of tire supporting spring arms and means for spreading the arms to reliably secure the tires.

With this and other objects in view, the invention consists in the novel construction, arrangement and formation of parts as will be hereinafter specifically described, claimed and illustrated in the accompanying drawing, in which:

Figure 1 represents a perspective view of the improved tire holder, and Fig. 2 represents a plan view of the expansible element of the holder removed.

Referring to the drawing in detail, wherein similar reference numerals designate corresponding parts throughout the several views, the numeral 5 indicates an annular member or band which is adapted to be rigidly secured in position upon a motor vehicle (not shown) and is provided with a plurality of laterally projecting ears 6. Substantially flat spring arms 7 are secured at one end by rivets 8, or equivalent means, to the laterally projecting ears 6 and the portions thereof adjacent the opposite extremities are curved outwardly, as indicated at 9, and thence inwardly to define hooks 10.

A contractible element, designated generally by the numeral 11, is engaged in the hooked extremities 10 of the spring arms 7 and normally retains the latter in proper spaced parallel relation, as illustrated in Fig. 1. The contractible element 11 consists of a curved strip of spring material 12 having the opposite ends flattened for the reception of pivot pins or rivets 13. One end of a lever 14 is pivotally secured to one end of the spring member 12 and intermediate its ends the lever 14 is pivotally connected with the opposite end of the spring element 12. The end of the lever 14 opposite its pivotal connection with the ends of the spring element 12 is offset and curved to define a hook 15 adapted to engage over the spring member 12 to secure the lever in operative position relative to the spring element. An outwardly and radially projecting stop pin 16 is rigidly secured to the spring member 12 adjacent one end thereof and is adapted to engage one of the spring arms 7 to limit the rotational movement of the contractive element 11 within the hooked ends of the spring arms.

In use, when it is desired to place one or more tire or tires upon the form or holder, the free end of the lever 14 is flexed so as to disengage the hook 16 thereof from the adjacent portion of the spring element 12 and said lever is subsequently moved to the position shown in Fig. 2, thus drawing the ends of the spring element together and reducing the diameter thereof so as to facilitate removal of the contractible element from the hooked ends 10 of the spring arms. Subsequent to the removal of the contractible element the hooked ends of the spring arms 7 are moved inwardly toward the center of the ring 5 and it is clearly evident that the tire may be conveniently slipped upon the arms. After the tires have been placed upon the form the contractible element 11 is engaged within several of the hooked ends 10 of the spring arms and the lever 14 is swung back to the position illustrated in Fig. 1, thus increasing the diameter of the contractible element and spreading the spring arms 7 and simultaneously and reliably securing the tires in position upon the holder.

What we claim is:

1. A tire holder including an annular member, a plurality of spaced parallel spring arms carried by said annular member adapted to be flexed inwardly to facilitate the application of a tire thereto, and removable means for separating the free ends of the spring arms to secure the tire in position upon the holder.

2. A tire holder including an annular member, a plurality of spaced parallel spring arms carried by said annular member, hooks at the ends of said spring arms opposite said annular member, and means removably engaged in the hooked ends of the arms for retaining the free ends of the latter in predetermined spaced relation.

3. A tire holder including an annular member, a plurality of spring arms carried by said annular member, a contractible element engaged with the ends of the spring arms opposite the annular member for retaining the spring arms in spaced parallel relation, and means for retaining said contractible element in expanded position.

4. A tire holder including an annular member, a plurality of spring arms carried thereby, and a contractible element removably engaged with the ends of the spring arms opposite the annular member for retaining said arms in spaced parallel relation.

5. A tire holder including an annular member, a plurality of spring arms secured to said annular member, the ends of said spring arms opposite the annular member being curved outwardly and hooked, a substantially annular spring element engaged within the hooked ends of the spring arms, and a lever pivotally connected with the free ends of the spring element for contracting the latter to facilitate removal thereof from the hooked ends of the spring arms.

6. A tire holder including an annular member, a plurality of spring arms secured to said annular member, the ends of said spring arms opposite the annular member being curved outwardly and hooked, and a contractible element movably engaged in the hooked ends of said spring arms.

7. A tire holder including an annular member, a plurality of spring arms secured to said annular member having hooked free ends, and a substantially annular spring element engaged in the hooked ends of said spring arms, a lever pivotally connected with the opposite ends of said spring element for contracting the latter, and a hook carried by the free end of said lever for securing the latter in adjusted position.

In testimony whereof we affix our signatures in presence of two witnesses.

JOHN W. ATKINSON.
HIRUM J. BROWN.

Witnesses:
S. S. TILLERY,
W. W. WOOD.